US012548287B2

(12) United States Patent
Zhang et al.

(10) Patent No.: US 12,548,287 B2
(45) Date of Patent: Feb. 10, 2026

(54) MULTI-MODAL REMOTE SENSING IMAGE HYBRID MATCHING METHOD AND SYSTEM WITH MULTI-DIMENSIONAL ORIENTED SELF-SIMILAR FEATURES

(71) Applicant: WUHAN UNIVERSITY, Hubei (CN)

(72) Inventors: Yongjun Zhang, Hubei (CN); Yongxiang Yao, Hubei (CN); Wenfei Zhang, Hubei (CN); Yi Wan, Hubei (CN); Mingtao Xiong, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 297 days.

(21) Appl. No.: 18/407,407

(22) Filed: Jan. 8, 2024

(65) Prior Publication Data
US 2025/0078444 A1    Mar. 6, 2025

(30) Foreign Application Priority Data
Aug. 28, 2023 (CN) .......................... 202311094813.7

(51) Int. Cl.
*G06V 10/44* (2022.01)
*G06T 3/4007* (2024.01)
(Continued)

(52) U.S. Cl.
CPC ............ *G06V 10/44* (2022.01); *G06T 3/4007* (2013.01); *G06T 5/20* (2013.01); *G06T 5/40* (2013.01);
(Continued)

(58) Field of Classification Search
CPC .... G06V 10/44; G06V 10/771; G06V 10/761; G06T 3/4007; G06T 5/20; G06T 5/40; G06T 2207/20132
(Continued)

(56) References Cited

U.S. PATENT DOCUMENTS

2022/0172080 A1* 6/2022 Chaudhury .......... G06N 3/0895
2023/0011829 A1* 1/2023 Ma ......................... G06V 20/70
(Continued)

*Primary Examiner* — Gabriel I Garcia
(74) *Attorney, Agent, or Firm* — JCIP GLOBAL INC.

(57) ABSTRACT

The present invention provides a method and system for multi-modal remote sensing image hybrid matching with multi-dimensional oriented self-similarity features. The method comprises: hybrid feature coarse matching is executed by rapidly extracting the image's self-similarity features using the offset mean filtering method and describing the feature points using the directional information of the self-similarity features. Through this coarse matching, an affine transformation model between multi-modal images is estimated, and an initial affine transformation is applied to the matched image. Next, the multi-dimensional oriented self-similarity feature fine matching is performed by constructing multi-dimensional oriented self-similarity template features using the multi-channel self-similarity map obtained from the hybrid feature coarse matching stage. Through a subsampling strategy applied to the constructed template features and convolution enhancement using a three-dimensional Gaussian kernel, the directional self-similarity features are strengthened. Finally, a three-dimensional phase consistency measure is used to identify highly accurate matching homologous points.

10 Claims, 3 Drawing Sheets

(51) Int. Cl.
  *G06T 5/20* (2006.01)
  *G06T 5/40* (2006.01)
  *G06V 10/74* (2022.01)
  *G06V 10/771* (2022.01)

(52) U.S. Cl.
  CPC .......... *G06V 10/761* (2022.01); *G06V 10/771* (2022.01); *G06T 2207/20132* (2013.01)

(58) Field of Classification Search
  USPC ........................................................ 382/190
  See application file for complete search history.

(56) References Cited

U.S. PATENT DOCUMENTS

| | | | |
|---|---|---|---|
| 2023/0259779 A1* | 8/2023 | Ye ........................ | G06F 16/783 |
| 2023/0421639 A1* | 12/2023 | Soon-Shiong ........ | H04L 41/022 |
| 2024/0160921 A1* | 5/2024 | Holbrook ................ | G06N 3/08 |
| 2025/0232876 A1* | 7/2025 | Crawford ................ | C12Q 1/34 |

* cited by examiner

(a) Matching results of multi-temporal optical image (b) Matching results of infrared and optical image (c) Matching results of day and night image (d) Matching results of SAR and optical image (e) Matching results of map and optical image (f) Matching results of optical and depth image

FIG. 4

MULTI-MODAL REMOTE SENSING IMAGE HYBRID MATCHING METHOD AND SYSTEM WITH MULTI-DIMENSIONAL ORIENTED SELF-SIMILAR FEATURES

CROSS-REFERENCE TO RELATED APPLICATION

This application claims the priority benefit of China application serial no. 202311094813.7, filed on Aug. 28, 2023. The entirety of the above-mentioned patent application is hereby incorporated by reference herein and made a part of this specification.

TECHNICAL FIELD

This present invention belongs to the field of remote sensing image processing method and system, specifically relates to a multi-modal remote sensing image hybrid matching method and system with multi-dimensional oriented self-similar features.

BACKGROUND

Multi-modal remote sensing image (MRSI) matching is the process of identifying corresponding points in images from different sensors and modalities. Matching multi-modal images provides technical support for map correction, precise positioning, feature extraction, target identification, surface change monitoring, 3D reconstruction, and stereoscopic vision.

However, with the challenges such as sensor differences, modality differences, and geometric differences of the registration of multi-modal remote sensing images, it is needed to integrates various of techniques for resolution. Over the past few years, experts and scholars have conducted extensive research on MRSI matching, continually improving algorithms to enhance matching accuracy and reliability. Despite the fact that human has making the efforts to enhance the robustness of multi-modal image matching, challenges in balancing geometric invariance with high-precision registration still exist. Traditional feature-based methods have advantages in addressing geometric transformation differences in MRSI. These methods, relying on flexible feature descriptors, can overcome geometric transformations such as rotation, scaling, and translation, typically based on local feature points or descriptors.

Due to the significant signal-to-noise ratio differences in MRSI, the accuracy of feature matching is often limited, and pixels with high signal-to-noise ratios may fail to extract features correctly, leading to matching failures or errors. On the other hand, template matching methods excel in the accuracy of identical point recognition. Template matching compares predefined templates pixel by pixel with the image to be matched, yielding highly accurate results. This method is particularly suitable for scenes requiring precise location of identical points. However, the pixel-by-pixel matching strategy of template matching often results in high computational complexity and poor resistance to geometric transformations in the image.

Therefore, in order to solve challenges such as signal-to-noise interference, nonlinear radiation distortion, and geometric transformation differences in MRSI, the present invention proposes a multi-modal remote sensing image hybrid matching method and system based on multi-dimensional oriented self-similar features, aiming to achieve high-precision matching.

SUMMARY

The present invention proposes a multi-modal remote sensing image hybrid matching method and system with multi-dimensional oriented self-similar features to address the high-precision matching problem in multi-modal remote sensing images.

The technical solution adopted in this invention consists of two core parts: blended feature coarse matching (steps 2-4) and multi-dimensional oriented self-similar feature fine matching (steps 5-8). The technical solution includes the following steps:

Step 1: Initialize the calculation parameters for hybrid matching.

Step 2: Use the offset mean filtering method to rapidly extract self-similar features from the reference image, generating a multi-channel self-similar feature map. Perform feature extraction and non-maximum suppression on the feature response map to obtain feature points.

Step 3: Describe feature points using the directional information of self-similar features. Calculate the main direction of feature points and statistically obtain descriptor feature vectors. Then, perform nearest neighbor distance ratio matching to output the initial correspondence between image pairs.

Step 4: Use the initial correspondence to geometrically transform the image to be matched, outputting the transformed result of the image to be matched.

Step 5: Calculate oriented self-similar features for both the reference image and the newly generated image to be matched, and produce a multi-channel self-similarity map.

Step 6: Design an angle-weighted strategy to calculate horizontal and vertical gradients for each channel of the obtained multi-channel self-similarity map. Conduct channel thinning to filter out repetitive features, obtaining multi-dimensional oriented self-similar template features.

Step 7: After generating multi-dimensional oriented self-similarity template features, enhance the feature channels using a three-dimensional Gaussian convolution kernel.

Step 8: Use a block feature detector to detect feature points in the reference image. Utilize feature points and a joint unit matrix to solve for the relative positions of each feature point in the newly generated image. Transform the enhanced template features from the spatial domain to the frequency domain. Accelerate template feature matching using three-dimensional phase correlation as a similarity measure, and finally, eliminate outliers to complete multi-modal remote sensing image matching.

Additionally, in Step 1, the calculation parameters include neighborhood radius, multi-dimensional oriented self-similar feature thinning interval, and descriptor neighborhood window.

Furthermore, in Step 2, for each pixel on the image, extract its self-similar feature values and calculate the feature response using the n smallest values. The feature response of point q is calculated as shown in Equation (1). Combine all pixel feature responses to form a feature response map, and then perform local non-maximum suppression to obtain feature points.

$$\lambda(q) = \frac{1}{n}\sum_{i=1}^{n} S_i^q \quad (1)$$

The above equation $\lambda(q)$ represents the feature response of point q and $\{S_i^q| i=1, 2, \ldots, n\}$ represents the n smallest self-similarity values.

Further, the specific implementation of Step 3 is as follows:

(1) Calculation of Feature Point Main Direction: Taking a feature point as the center, a fixed circular neighborhood is selected, and the main direction is determined based on the self-similar feature values by generating an oriented histogram. The specific steps are as follows: Firstly, the histogram is evenly divided into K partitions. Next, for the feature point P, which is the point of interest for determining the main direction, K points are uniformly sampled along the boundary of a feature neighborhood with a radius of r from P. For these K points, their self-similar feature sequences are collected and denoted as $S_1, S_2 \ldots S_K$. Subsequently, the self-similar feature sequences are normalized, and the peak directions in the histogram, accounting for more than P % of the total, are selected as the main direction of the feature point. Here, both K and P are constants.

(2) Descriptor Feature Vector Computation: The descriptor neighborhood of a feature point is based on a circular region extracted from a multi-channel self-similar graph. Within the descriptor neighborhood, for each pixel, the index value of the minimum self-similar direction is computed, resulting in the generation of an oriented index map. Finally, the oriented index map is transformed into a logarithmic polar coordinate grid, and within each grid interval, a distribution histogram is generated to form the feature descriptor vector.

(3) Initial Correspondence Calculation: The method employs a nearest-neighbor distance ratio matching strategy to determine the initial matching homologous points. Simultaneously, it integrates the fast sample consensus algorithm to effectively eliminate mismatches. In the nearest-neighbor distance ratio matching strategy, the process begins by calculating the Euclidean distance between any two descriptors in the two images. Subsequently, for each descriptor in the reference image, the ratio of the minimum distance to the second minimum distance is computed. Finally, descriptors with distance ratio values less than a certain threshold 'd' are extracted as matching pairs with their nearest descriptors.

Furthermore, in Step 5: the method initially employs offset mean filtering to rapidly acquire a self-similarity graph for pixel directions $q(p,\theta)$ on the target matching image. This process involves two steps: image cropping and mean filtering. By cropping the original image to construct a central sub-image $I_{crop}^c$ and an offset sub-image $I_{crop}^d$, the self-similarity graph $S^q$ for the $q(p,\theta)$ direction of points can be computed using the following Equation (2):

$$S^q = meanFilter(|I_{crop}^c - I_{crop}^d|) \quad (2)$$

In the equation, meanFilter(□) represents mean filtering operation, p represents pixel distance, and θ represents the angle, taking values within the range [0°, 180°]. The method involves pixel shifting on the newly generated target matching image, followed by bilinear interpolation to obtain offset sub-images in any direction. The central sub-image is obtained by shrinking the original input image by one pixel on all four edges, with point q as the center. The multi-channel self-similarity graph is denoted as $\{S^q\}_C^1$, where C represents the number of channels, and N represents the number of pixels in the feature neighborhood. Due to the symmetry of self-similarity features, performing C=N/2 iterations of offset mean filtering yields the multi-channel self-similarity graph for the entire image.

Furthermore, the specific implementation of Step 6 is as follows:

Firstly, for the obtained multi-channel self-similarity graph $\{S^q\}_C^1$, the horizontal gradient $g_x$ and vertical gradient $g_y$ are computed for each channel using the Sobel operator, as shown in Equation (3):

$$\begin{cases} g_x(x, y) = S^q \otimes h \\ g_y(x, y) = S^q \otimes h^T \end{cases} \quad (3)$$

In the equation, $g_x$ represents the horizontal gradient, $g_y$ represents the vertical gradient, $S^q$ represents the input single-channel self-similarity graph, and ⊗ represents the convolution operation.

Next, the gradient direction is computed using Equation (4). For each channel, an angle-weighted strategy is applied to the multi-channel self-similarity graph, constructing a single-channel multi-dimensional oriented self-similarity feature Sg. This effectively enhances the rotational invariance of the self-similarity template features.

$$S_o^q = \tan^{-1}\left(\frac{-g_y(x, y)}{g_x(x, y)}\right) \quad (4)$$

$$S_o^q = \begin{cases} S_o^q, & S_o^q \geq 0 \\ S_o^q + \pi, & S_o^q < 0 \end{cases} \quad (5)$$

$S_o^q$ represents the single-channel multi-dimensional oriented self-similarity feature.

For multi-channel self-similarity features, an angle-weighted strategy is applied to each channel to construct the multi-channel multi-dimensional oriented self-similarity feature $\{S_o^q\}_C^1$. When building the multi-channel self-similarity graph, a circular feature neighborhood N with a radius of R pixels is used, with a total of C=N/2 channels. Consequently, the resulting multi-channel multi-dimensional oriented self-similarity feature $\{S_o^q\}_C^1$ has a dimension of C. To enhance the efficiency of template feature matching calculations, a sparsification strategy is applied to the feature channels. This is achieved through the following equation (6) to obtain a sparsified w-dimensional template feature map $\{S_o^q\}_w^1$.

$$w = \lceil C/m \rceil \quad (6)$$

Wherein, w represents the dimensionality of the sparsified multi-dimensional oriented self-similarity feature, C represents the dimensionality of the original multi-dimensional oriented self-similarity feature, m is the sampling interval, and the arithmetic symbol ⌈ ⌉ denotes rounding up.

Furthermore, in Step 7, the Gaussian convolution kernel consists of a two-dimensional Gaussian kernel in the horizontal and vertical directions and a kernel $d_z=[1, 3, 1]^T$ in the Z direction, as shown in Equation 7:

$$\begin{cases} S_o^\sigma(x, y) = g_{xy}^\sigma \otimes S_o^q \\ M^\sigma(x, y) = d_z \otimes S_o^\sigma(x, y) \end{cases} \quad (7)$$

Wherein, $S_o^\sigma(x, y)$ represents the features after two-dimensional Gaussian filtering, $g_{xy}^\sigma$ represents the Gaussian kernel on the plane, $S_o^q$ represents the single-channel multi-dimensional oriented self-similarity feature, $M^\sigma(x, y)$ represents the template feature after three-dimensional Gaussian filtering, $d_z$ is the Gaussian kernel in the z direction, $\otimes$ represents convolution operation, and $\sigma$ is the standard deviation of the Gaussian convolution kernel.

Finally, the multi-dimensional oriented self-similarity features are normalized, and then the features of $M_i^\sigma(x, y)$ are combined to form a multi-dimensional oriented self-similarity feature map, as shown in Equation 8:

$$MOSS(x, y) = \{M_i^\sigma(x, y)\}, i = [1, 2, 3 \ldots, w] \quad (8)$$

Wherein, w represents the dimensionality of the sparsified multi-dimensional oriented self-similarity feature.

In further detail, in step 8, a block feature detector employs the FAST detection model and utilizes a strategy of uniformly dividing the image into a grid. The image is initially divided into equally sized small blocks, and feature points are then extracted separately in each small block. A fast sampling consensus algorithm is used to eliminate outliers.

Furthermore, step 9 involves evaluating the matching performance of multi-modal remote sensing images using the root mean square error of corresponding points and the number of matched points.

The invention also provides a multi-modal remote sensing image hybrid matching system with multi-dimensional oriented self-similar features, comprising the following modules:

Initialization Module: Configured to initialize the computational parameters for the hybrid matching.

Feature Point Extraction Module: Configured to utilize the offset mean filtering method to rapidly extract self-similar features of the reference image, generates a multi-channel self-similar feature map, and performs feature extraction and non-maximum suppression on the feature response map to obtain feature points.

Initial Correspondence Acquisition Module: Configured to use the oriented information of self-similar features to describe feature points, calculates the main direction of feature points, and computes descriptor feature vectors. Then, it performs nearest-neighbor distance ratio matching, outputting the initial correspondence relationships of image pairs.

Transformation Module: Configured to use the initial correspondence relationships to perform geometric transformation on the image to be matched, outputting the transformed results of the image to be matched.

Oriented Self-Similar Feature Computation Module: Configured to compute oriented self-similar features for both the reference image and the newly generated image to be matched. It outputs a multi-channel self-similar map.

Multi-Dimensional Oriented Self-Similar Template Feature Acquisition Module: Configured to employ an angle-weighted strategy to calculate horizontal and vertical gradients channel-wise on the obtained multi-channel self-similar map. It applies channel sparsity filtering to eliminate duplicate features and solves for multi-dimensional oriented self-similar template features.

Feature Enhancement Module: Configured to utilize a three-dimensional Gaussian convolution kernel to enhance the feature channels after generating multi-dimensional oriented self-similarity template features.

Matching Module: Configured to detect feature points in the reference image using a block feature detector. It utilizes these feature points along with a joint unit matrix to solve for the relative positions of each feature point in the newly generated image to be matched. Subsequently, the enhanced template features are transformed from the spatial domain to the frequency domain. Three-dimensional phase correlation is employed as a similarity measure to accelerate the matching of template features, acting as a surrogate for similar patterns. Finally, outliers are eliminated to refine the matching process, achieving the completion of multi-modal remote sensing image matching.

DETAILED DESCRIPTION

In order to facilitate a better understanding and implementation of the present invention by those skilled in the art, a detailed description of the invention is provided below, along with the accompanying drawings. It should be understood that the embodiments described here are for illustration and explanation purposes and are not intended to limit the scope of the invention.

Figure 1:
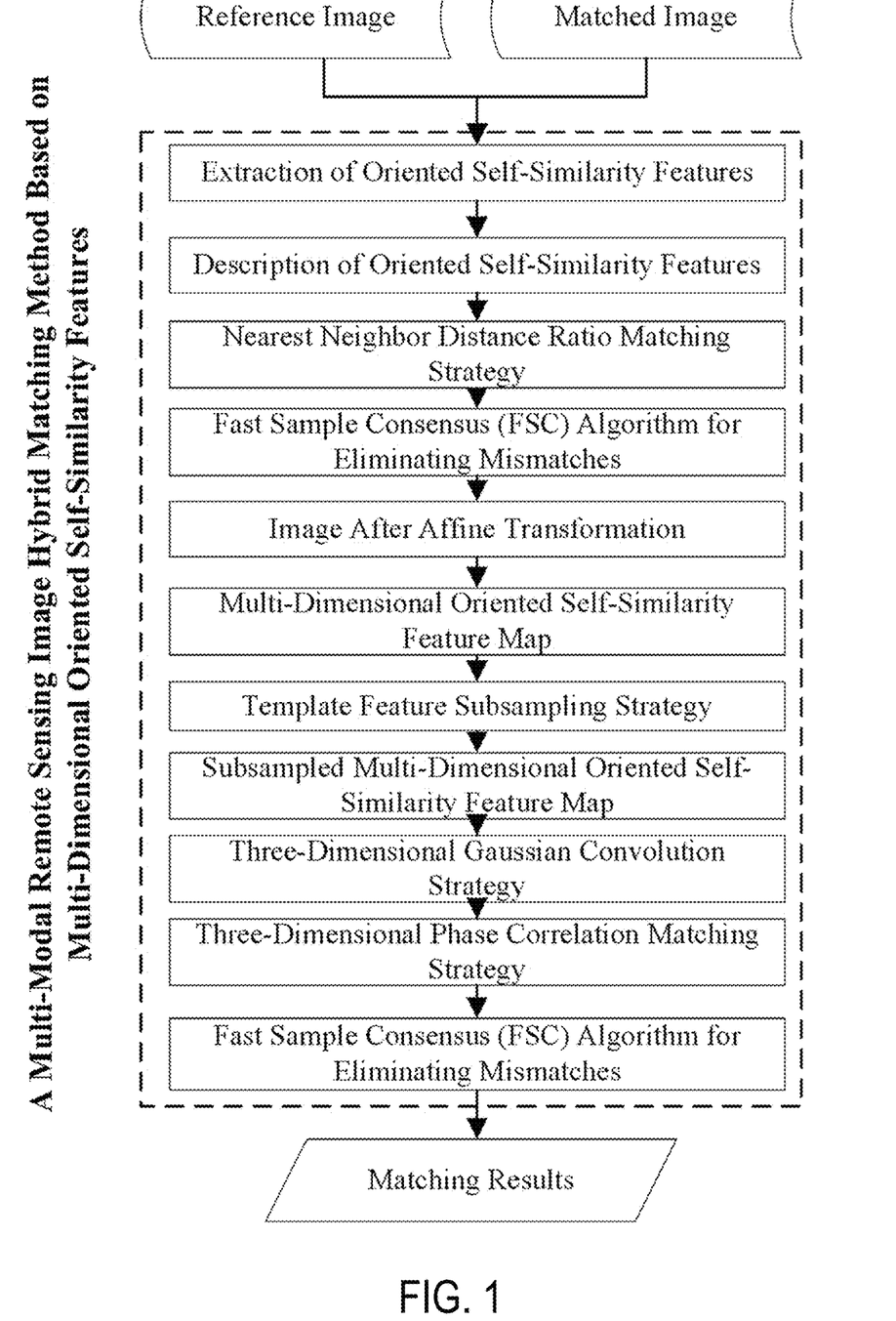
FIG. 1: Flowchart of the method proposed in the present invention.

Please refer to FIG. 1, which presents the flowchart of a multi-modal remote sensing image matching method with multi-dimensional oriented self-similar features. The method includes the following steps:

Step 1: Initialize parameters for mixed-feature coarse matching, such as the neighborhood radius, multi-dimensional oriented self-similar feature sparsity interval, and descriptor neighborhood window, set to 4, 2, and 96, respectively.

Step 2: Utilize the offset mean filtering method to rapidly extract self-similar features from the reference image, generating a multi-channel self-similar feature map. Perform feature extraction and non-maximum suppression on the feature response map to obtain feature points.

In a self-similarity feature detector, pixels that exhibit high dissimilarity with their surrounding pixels are considered as feature points. Therefore, for each pixel on the image, its self-similarity feature value is extracted, and the n smallest values in its self-similarity feature values are recorded. The feature response for a point q is calculated as shown in Equation (1). The feature responses A for all pixels form a feature response map. Subsequently, local non-maximum suppression is applied to the feature response map to obtain the final set of feature points.

$$\lambda(q) = \frac{1}{n}\sum_{i=1}^{n} S_i^q \qquad (1)$$

The above equation $\lambda(q)$ represents the feature response of point q and $\{S_i^q | i=1, 2, \ldots, n\}$ represents the n smallest self-similarity values. (As a preference, the value of n in this invention is set to 4.)

Step 3: Utilize the oriented information of self-similarity features to describe feature points, sequentially performing computations for the main orientation of feature points and the statistical generation of descriptor feature vectors. Subsequently, conduct nearest-neighbor distance ratio matching to output the initial correspondence relationships between image pairs.

(1) Computation of Feature Point Main Orientation: This step aims to ensure the rotational invariance of descriptors. The main orientation of feature points is computed using the following method: a fixed circular neighborhood is selected with the feature point at its center, and a directional histogram is generated based on self-similarity feature values to determine the main orientation. The specific steps are as follows: first, the histogram is evenly divided into 36 bins, each representing a 10° interval. Then, for the feature point P under consideration for the main orientation determination, 36 points are uniformly sampled along the boundary of the feature neighborhood with a radius r from P. For these 36 points, their self-similarity feature sequences are recorded as $S_1, S_2 \ldots S_{36}$. Subsequently, the self-similarity feature sequences are normalized, and the peak direction in the histogram, accounting for more than 80%, is selected as the main orientation of the feature point.

(2) Statistical Generation of Descriptor Feature Vectors: To enhance feature matching efficiency and reduce the dimensionality of feature descriptors, a logarithmic polar grid is used to count feature vectors. The descriptor neighborhood of a feature point is based on a circular region extracted from the multi-channel self-similarity map. At each pixel within the descriptor neighborhood, an oriented index map is generated by calculating the index of the minimum self-similarity direction. Finally, the oriented index map is logarithmically polar-grided, and a distribution histogram is generated within each grid interval as the feature descriptor vector.

(3) Initial Correspondence Calculation: The nearest-neighbor distance ratio matching strategy is employed to determine initial correspondences between matching points. Simultaneously, the fast sample consensus algorithm is used to effectively eliminate mismatches. The nearest-neighbor distance ratio matching strategy first computes the Euclidean distance between any two descriptors in the two images. Next, for each reference image descriptor, the ratio of the minimum distance to the second minimum distance is calculated. Finally, descriptors with distance ratio values less than a certain threshold (d) are extracted as matching pairs with their closest descriptors.

Step 4: Utilize the initial correspondence relationships to apply geometric transformations to the image to be matched, outputting the transformed result of the image to be matched.

Figure 2:
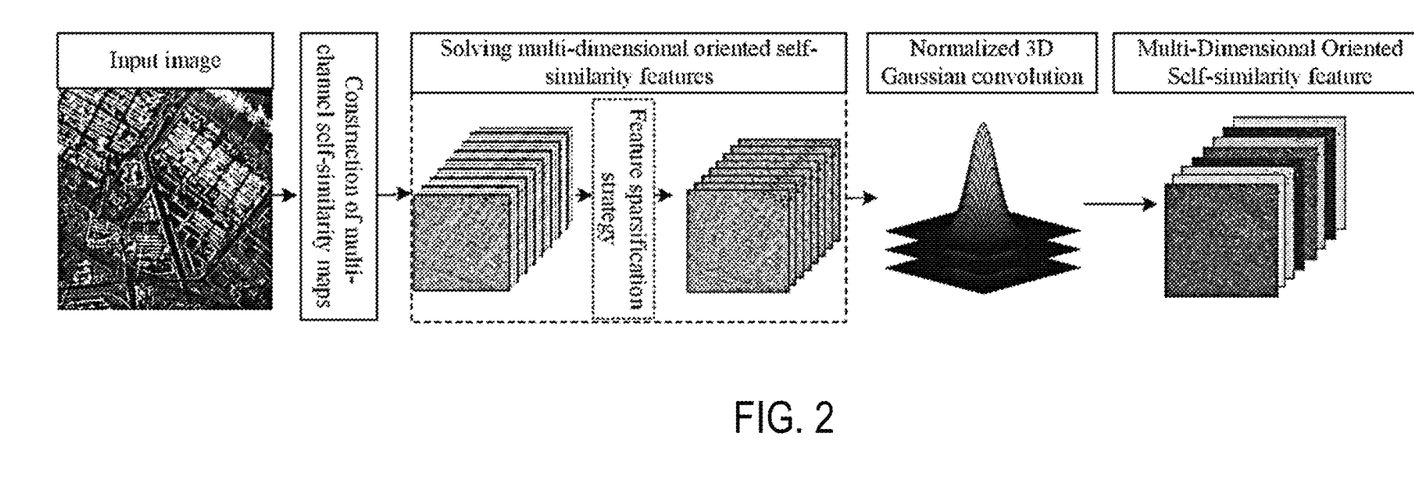
FIG. 2: Schematic diagram illustrating the construction process of multi-dimensional oriented self-similar template features in an embodiment of the present invention.

Step 5: Compute oriented self-similarity features for the reference image (i.e., the original input image) and the newly generated image to be matched, resulting in a multi-channel self-similarity map. Employ offset mean filtering for rapid acquisition of the self-similarity map in the q(p,θ) direction, involving image cropping and mean filtering. Here, point q(p,θ) refers to each pixel in both the reference image and the image to be matched, with p denoting pixel distance and θ representing the angle, ranging from [0°, 180°). Through cropping the newly generated image from Step 4, constructing a central sub-image $I_{crop}^c$ and an offset sub-image $I_{crop}^d$, and pixel-wise shifting (2 pixels), any directional offset sub-image can be obtained using bilinear interpolation. The central sub-image is obtained by shrinking one pixel from all four edges of the original image, with the point q as the center. After obtaining the sub-images, the self-similarity map S" in the direction of point q(p,θ) can be calculated using the following Equation (2).

$$S^q = meanFilter(|I_{crop}^c - I_{crop}^d|) \qquad (2)$$

In the equation, meanFilter(□) represents the mean filtering operation. A circular filtering window with a radius of 2 pixels is employed, as this circular window enhances the rotational invariance of self-similarity features.

The multi-channel self-similarity map can be denoted as $\{S^q\}_C^1$, where C represents the number of channels, and N denotes the number of pixels in the feature neighborhood. Due to the symmetry of self-similarity features, performing C=N/2 iterations of offset mean filtering allows the acquisition of the multi-channel self-similarity map for the entire image.

Step 6: Design an angle-weighted strategy to compute horizontal and vertical gradients channel-wise for the obtained multi-channel self-similarity map. Perform channel subsampling to filter duplicate features and solve for a multi-dimensional oriented self-similarity template feature.

Firstly, for the acquired multi-channel self-similarity map $\{S^q\}_C^1$, apply the Sobel operator individually to compute the horizontal gradient $g_x$ and vertical gradient $g_y$ for each channel. The Sobel operator template h=[1, 2, 1; 0 0 0; −1, −2, −1] is expressed by Equation (3):

$$\begin{cases} g_x(x, y) = S^q \otimes h \\ g_y(x, y) = S^q \otimes h^T \end{cases} \qquad (3)$$

Here, $g_x$ represents the horizontal gradient, $g_y$ represents the vertical gradient, $S^q$ represents the input single-channel self-similarity map, and $\otimes$ denotes the convolution operation.

Next, utilize Equation (4) to calculate the gradient direction. Apply an angle-weighted strategy channel-wise to the multi-channel self-similarity map, constructing a single-channel multi-dimensional oriented self-similarity feature $S_o^q$. This effectively enhances the rotational invariance of the self-similarity template features. It's worth noting that if the gradient direction is less than 0, adding $\pi$ ensures that the gradient direction value is always greater than 0, representing in equation (5).

$$S_o^q = \tan^1\left(\frac{-g_y(x, y)}{g_x(x, y)}\right) \quad (4)$$

$$S_o^q = \begin{cases} S_o^q, & S_o^q \geq 0 \\ S_o^q + \pi, & S_o^q < 0 \end{cases} \quad (5)$$

Here, $S_o^q$ represents the single-channel multi-dimensional oriented self-similarity feature.

For the multi-channel self-similarity features, apply an angle-weighted strategy channel-wise to construct a multi-channel multi-dimensional oriented self-similarity feature $\{S_o^q\}_C^1$. In the construction of the multi-channel self-similarity map, a circular feature neighborhood N with a radius R and C=N/2 channels are employed. Consequently, the multi-channel multi-dimensional oriented self-similarity feature $\{S_o^q\}_C^1$ has a dimensionality of C. To enhance the efficiency of template feature matching computations, a subsampling strategy is applied to the feature channels through Equation (6), resulting in the w-dimensional template feature map $\{S_o^q\}_w^1$.

$$w = \lceil C/m \rceil \quad (6)$$

Wherein, w represents the dimensionality of the sparsified multi-dimensional oriented self-similarity feature, C represents the dimensionality of the original multi-dimensional oriented self-similarity feature, m is the sampling interval, and the symbol $\lceil\ \rceil$ denotes rounding up.

Step 7: After generating the multi-dimensional oriented self-similarity template feature, enhance the feature channels using a three-dimensional Gaussian convolution kernel to mitigate the impact of geometric deformations and nonlinear radiometric distortions between images.

The Gaussian convolution kernel consists of a two-dimensional Gaussian kernel in the horizontal and vertical directions (preferably with a standard deviation set to 0.8) and an additional kernel in the Z direction denoted as $d_z=[1, 3, 1]^T$. The three-dimensional Gaussian convolution is described by the following equation (7):

$$\begin{cases} S_o^\sigma(x, y) = g_{xy}^\sigma \otimes S_o^q \\ M^\sigma(x, y) = d_z \otimes S_o^\sigma(x, y) \end{cases} \quad (7)$$

Wherein, $S_o^\sigma(x, y)$ represents the features after two-dimensional Gaussian filtering, $g_{xy}^\sigma$ represents the Gaussian kernel on the plane, $S_o^q$ represents the single-channel multi-dimensional oriented self-similarity feature, $M_\sigma(x, y)$ represents the template feature after three-dimensional Gaussian filtering, $d_z$ is the Gaussian kernel in the z direction, $\otimes$ represents convolution operation, and $\sigma$ is the standard deviation of the Gaussian convolution kernel.

Next, the feature vector $M_\sigma(x, y)$ is scaled to the same magnitude using a normalization operation, enhancing its robustness. This can be represented by Equation (8):

$$M_i^\sigma(x, y) = \frac{M_i^\sigma(x, y)}{\sqrt{\sum_{i=1}^{w}|M_i^\sigma(x, y)|^2 + \varepsilon}} \quad (8)$$

Where $\varepsilon$ is set to a non-zero, extremely small constant to avoid division by zero. Finally, combine the features of $M_i^\sigma(x, y)$ to form a multi-dimensional oriented self-similarity feature map MOSS(x, y). The mathematical formulation is defined by the following Equation (9):

$$MOSS(x, y) = \{M_i^\sigma(x, y)\}, i = [1, 2, 3 \ldots, w] \quad (9)$$

Where w represents the dimensionality of the subsampled multi-dimensional oriented self-similarity feature.

Figure 4:
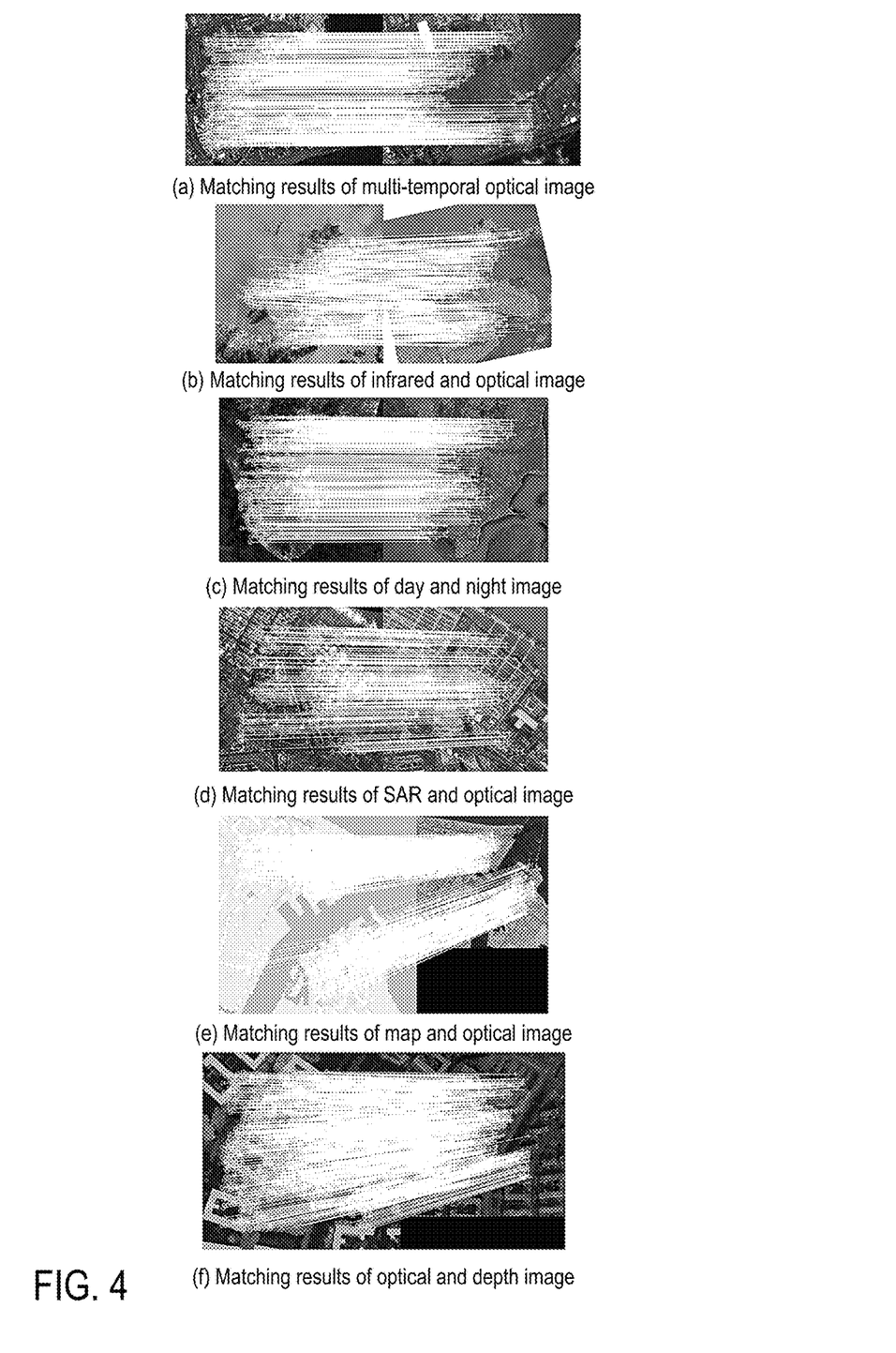
FIG. 4: Matching results of multi-modal remote sensing images in an embodiment of the present invention.

Step 8: Utilize a block-based feature detector (FAST detector is used) to detect feature points in the reference image. Considering that the template feature is three-dimensional, employ Fourier transform to transform the feature template from the spatial domain to the frequency domain. Use three-dimensional phase correlation as a similarity measure to accelerate matching with template features (matching feature points in the reference image with feature points obtained through unit matrix transformation on a newly transformed image). Apply the fast sample consensus algorithm to eliminate mismatches. The results are shown in FIG. 4.

Figure 3:
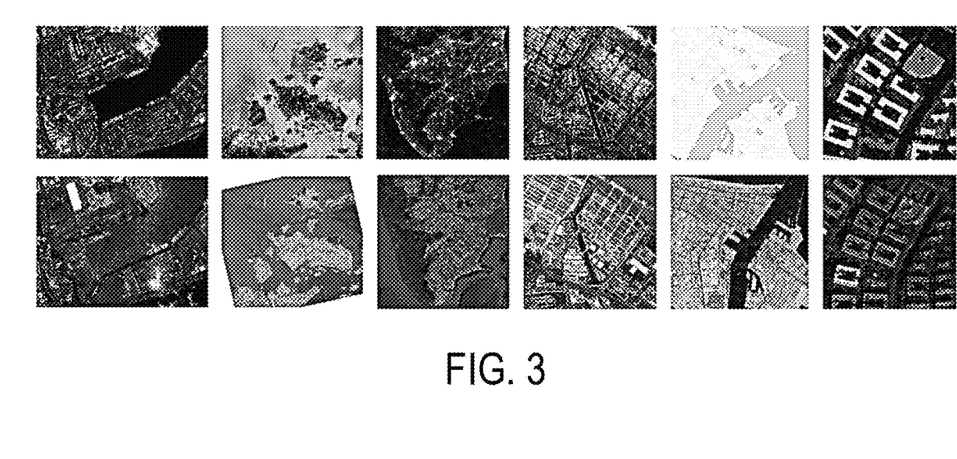
FIG. 3: Multi-modal remote sensing image dataset in an embodiment of the present invention. Each column from left to right represents multi-temporal optical images, infrared images combined with optical images, night lights images combined with optical images, SAR images combined with optical images, navigation maps combined with optical images, and optical images combined with depth images, respectively.

Step 9: Evaluate the matching performance of multi-modal remote sensing images. The proposed method, named MOSS, is tested on five sets of multi-modal remote sensing images, as shown in FIG. 3. For each image pair, quantitative evaluation is performed using the root-mean-square error (RMSE) of corresponding points and the number of matched corresponding points. The RMSE is measured in pixels. The comparison involves the MOSS method and several optimal image matching methods (SIFT, PSO-SIFT, RIFT, OSS, and HOWP). The comparison results are presented in Table 1.

TABLE 1

| Comparison of Various Image Matching Methods | | | | | | | |
|---|---|---|---|---|---|---|---|
| | Image Types | 1 | 2 | 3 | 4 | 5 | 6 |
| SIFT | Number of correct match (NCM) | 66 | 0 | 40 | 0 | 61 | 0 |
| | RMSE | 1.22 | 7 | 1.80 | 7 | 1.58 | 7 |
| PSO-SIFT | NCM | 0 | 75 | 0 | 0 | 38 | 137 |
| | RMSE | 7 | 1.87 | 7 | 7 | 2.57 | 5.60 |
| RIFT | NCM | 192 | 59 | 175 | 162 | 0 | 76 |
| | RMSE | 2.19 | 4.58 | 1.70 | 2.37 | 7 | 4.36 |

TABLE 1-continued

Comparison of Various Image Matching Methods

| | Image Types | 1 | 2 | 3 | 4 | 5 | 6 |
|---|---|---|---|---|---|---|---|
| OSS | NCM | 143 | 0 | 69 | 49 | 89 | 113 |
| | RMSE | 1.03 | 7 | 1.82 | 3.27 | 1.25 | 1.93 |
| HOWP | NCM | 349 | 167 | 65 | 161 | 335 | 289 |
| | RMSE | 0.97 | 2.54 | 2.31 | 2.57 | 1.24 | 1.62 |
| MOSS | NCM | 490 | 364 | 428 | 231 | 586 | 720 |
| | RMSE | 1.58 | 1.50 | 1.86 | 2.43 | 1.22 | 1.42 |

From Table 1, it can be observed that in multi-modal remote sensing image data, the MOSS method can obtain more corresponding point pairs compared to SIFT, PSO-SIFT, RIFT, OSS, and HOWP methods. The MOSS method proposed in this invention achieves optimal results. Moreover, the RMSE of the MOSS method is superior to that of SIFT, PSO-SIFT, RIFT, OSS, and HOWP methods. The average RMSE of the MOSS method is within 2 pixels, further demonstrating that MOSS not only significantly increases the number of corresponding points but also maintains good matching accuracy. It exhibits better performance in handling scale, rotation, and translation differences, demonstrating scale and rotation invariance.

In addition, the invention provides a multi-modal remote sensing image hybrid matching system based on multi-dimensional oriented self-similarity features, including the following modules:

Initialization Module: Initializes calculation parameters for hybrid matching.

Feature Point Extraction Module: Utilizes the offset mean filtering method to rapidly extract self-similarity features from the reference image, generates a multi-channel self-similarity feature map, and extracts features and performs non-maximum suppression on the feature response map to obtain feature points.

Initial Correspondence Acquisition Module: Describes feature points using the directional information of self-similarity features, completes main orientation calculation and descriptor feature vector statistics for feature points, and then performs nearest neighbor distance ratio matching to output the initial correspondence relationships for image pairs.

Transformation Module: Applies geometric transformations to the image to be matched based on the initial correspondence relationships, outputting the transformed result of the image to be matched.

Oriented Self-similarity Feature Calculation Module: Computes oriented self-similarity features for the reference image and the newly generated image to be matched, outputting a multi-channel self-similarity map.

Multi-dimensional Oriented Self-similarity Template Feature Extraction Module: Designs an angle-weighted strategy to calculate horizontal and vertical gradients for the obtained multi-channel self-similarity map, performs channel sub-sampling to filter duplicate features, and solves for a multi-dimensional oriented self-similarity template feature.

Feature Enhancement Module: After generating the multi-dimensional oriented self-similarity template feature, enhances the feature channels using a three-dimensional Gaussian convolution kernel.

Matching Module: Utilizes a block-based feature detector to detect feature points in the reference image, applies Fourier transform to transform the enhanced template features from the spatial domain to the frequency domain, and uses three-dimensional phase correlation as a similarity measure to accelerate template feature matching. Fast sample consensus algorithm is applied to eliminate mismatches, completing multi-modal remote sensing image matching.

In comparison to existing techniques, the present invention offers the following advantages and beneficial effects:

The proposed multi-modal remote sensing image matching method consists of two main components: mixed-feature coarse matching and multi-dimensional oriented self-similar feature fine matching. The first part involves mixed-feature coarse matching, where the oriented self-similar algorithm is used to rapidly extract self-similar features from the image using the offset mean filtering method. The features are then described using the directional information of self-similar features. This coarse matching estimates an affine transformation model between multi-modal images, and an initial affine transformation is applied to eliminate geometric differences between the images. The second part is multi-dimensional oriented self-similar feature fine matching. A representation method based on multi-dimensional oriented self-similar features is proposed. The multi-dimensional self-similar template features are constructed using the multi-channel self-similar map obtained during the mixed-feature coarse matching phase. A template feature sparsity strategy is designed, and a three-dimensional Gaussian kernel is used to convolve the template features, enhancing their expressive capability. Subsequently, a more accurate registration relationship is established using a three-dimensional phase correlation matching strategy. A fast sampling consensus algorithm is employed to eliminate mismatches, and the images are then fused, completing the registration of multi-modal remote sensing images. Results show that the proposed method effectively achieves matching of multi-modal remote sensing images and is more robust compared to traditional methods.

The specific implementation details of each module and corresponding steps are not provided in this disclosure.

It should be understood that parts not elaborated in this specification are considered part of the prior art.

It should be understood that the detailed description above pertains to preferred embodiments and should not be construed as limiting the scope of the patent protection for the present invention. Those skilled in the art, guided by the teachings of the present invention, can make substitutions or modifications without departing from the scope of the claims, as defined by the appended claims.

What is claimed is:

1. A method for multi-modal remote sensing image hybrid matching with multi-dimensional oriented self-similarity features, comprising the following steps:
 S1: Initializing the Calculation Parameters for the hybrid matching;

S2: Utilizing the offset mean filtering method to rapidly extract self-similarity features from the reference image, involving generating multi-channel self-similarity feature maps and performing feature extraction and non-maximum suppression on the feature response map to obtain feature points;

S3, Utilizing the directional information of self-similarity features to describe feature points, involving calculating the main direction of feature points, computing descriptor feature vectors, and then performing nearest-neighbor distance ratio matching to output the initial correspondence relationships between image pairs;

S4, Using the initial correspondence relationships to apply geometric transformation to the image to be matched, resulting in the transformed matching image;

S5, Calculating multi-channel self-similarity features for both the reference image and the newly generated matching image;

S6, Designing an angle-weighting strategy for the obtained multi-channel self-similarity maps, including calculating horizontal and vertical gradients channel-wise, filtering duplicate features through channel thinning, and solving for multi-dimensional oriented self-similarity template features;

S7, After generating multi-dimensional oriented self-similarity template features, enhancing the feature channels using a three-dimensional Gaussian convolution kernel; and S8, Employing a block feature detector to detect feature points in the reference image, using the joint unit matrix of feature points to solve for the relative positions of feature points in the newly generated matching image, and subsequently, transforming the enhanced template features from spatial domain to frequency domain, using three-dimensional phase correlation as a similarity measure to accelerate matching of similar template features, and finally eliminating outliers to complete the multi-modal remote sensing image matching.

2. The method for multi-modal remote sensing image hybrid matching with multi-dimensional oriented self-similarity features according to claim 1, wherein the calculation parameters in step 1 includes neighborhood radius, multi-dimensional oriented self-similarity feature thinning interval, and descriptor neighborhood window.

3. The method for multi-modal remote sensing image hybrid matching with multi-dimensional oriented self-similarity features according to claim 1, wherein in step 2, for each pixel on the image, extracting self-similarity feature values, and the n smallest values in the self-similarity feature values are calculated;

The feature response of point q is calculated as shown in Equation (1), wherein all pixel points' feature responses form a feature response map; and Subsequently, local non-maximum suppression is applied to the feature response map to obtain feature points, $$\lambda(q) = \frac{1}{n}\sum_{i=1}^{n} S_i^q \qquad (1)$$

Wherein the $\lambda(q)$ represents the feature response of point q and $\{S_i^q|\ i=1, 2, \ldots, n\}$ represents the n smallest self-similarity values.

4. The method for multi-modal remote sensing image hybrid matching with multi-dimensional oriented self-similarity features according to claim 1, wherein the specific implementation of S3 as follows:

(1) Calculation of Feature Point Main Direction: Taking a feature point as the center, a fixed circular neighborhood is selected, and the main direction is determined based on the self-similar feature values by generating an oriented histogram, further including:

evenly dividing the histogram into K partitions;

for the feature point P, which is the point of interest for determining the main direction, K points are uniformly sampled along the boundary of a feature neighborhood with a radius of r from P;

For these K points, their self-similar feature sequences are collected and denoted as $S_1, S_2 \ldots S_K$; and Subsequently, the self-similar feature sequences are normalized, and the peak directions in the histogram, accounting for more than P % of the total, are selected as the main direction of the feature point, wherein both K and P are constants;

(2) Descriptor Feature Vector Computation: The descriptor neighborhood of a feature point is based on a circular region extracted from a multi-channel self-similar graph; within the descriptor neighborhood, for each pixel, the index value of the minimum self-similar direction is computed, resulting in the generation of an oriented index map; and finally, the oriented index map is transformed into a logarithmic polar coordinate grid, and within each grid interval, a distribution histogram is generated to form the feature descriptor vector; and (3) Initial Correspondence Calculation: The method employs a nearest-neighbor distance ratio matching strategy to determine the initial matching homologous points; simultaneously integrating the fast sample consensus algorithm to effectively eliminate mismatches; in the nearest-neighbor distance ratio matching strategy, the process begins by calculating the Euclidean distance between any two descriptors in the two images; subsequently, for each descriptor in the reference image, the ratio of the minimum distance to the second minimum distance is computed; and finally, descriptors with distance ratio values less than a certain threshold 'd' are extracted as matching pairs with their nearest descriptors.

5. The method for multi-modal remote sensing image hybrid matching with multi-dimensional oriented self-similarity features according to claim 1, wherein In S5, the method initially employs offset mean filtering to rapidly acquire a self-similarity graph for pixel directions $q(p,\theta)$ on the target matching image, further comprising two steps: image cropping and mean filtering, by cropping the original image to construct a central sub-image $I_{crop}^c$ and an offset sub-image $I_{crop}^d$, the self-similarity graph $S^q$ for the $q(p,\theta)$ direction of points crop can be computed using the following Equation (2):

$$S^q = meanFilter(|I_{crop}^c - I_{crop}^d|) \qquad (2)$$

wherein meanFilter($\square$) represents mean filtering operation, p represents pixel distance, and $\theta$ represents the angle, taking values within the range [0°, 180°), involving pixel shifting on the newly generated target matching image, followed by bilinear interpolation to obtain offset sub-images in any direction; the central sub-image is obtained by shrinking the original input image by one pixel on all four edges, with point q as the center; the multi-channel self-similarity graph is denoted as $\{S^q\}_C^1$, where C represents the number of channels, and N represents the number of pixels in the feature neighborhood; and due to the symmetry of self-similarity features, performing C=N/2 iterations of offset mean filtering yields the multi-channel self-similarity graph for the entire image.

6. The method for multi-modal remote sensing image hybrid matching with multi-dimensional oriented self-similarity features according to claim 1, wherein In step 6, the specific implementation is as follows: Firstly, for the obtained multi-channel self-similarity graph $\{S^q\}_C^1$, the horizontal gradient $g_x$ and vertical gradient $g_y$ are computed for each channel using the Sobel operator, as shown in Equation (3):

$$\begin{cases} g_x(x, y) = S^q \otimes h \\ g_y(x, y) = S^q \otimes h^T \end{cases} \quad (3)$$

wherein $g_x$ represents the horizontal gradient, $g_y$ represents the vertical gradient, $S^q$ represents the input single-channel self-similarity graph, and $\otimes$ represents the convolution operation;

the gradient direction is computed using Equation (4), wherein for each channel, an angle-weighted strategy is applied to the multi-channel self-similarity graph, constructing a single-channel multi-dimensional oriented self-similarity feature $S_o^q$, effectively enhancing the rotational invariance of the self-similarity template features:

$$S_o^q = \tan^1\left(\frac{-g_y(x, y)}{g_x(x, y)}\right) \quad (4)$$

$$S_o^q = \begin{cases} S_o^q, & S_o^q \geq 0 \\ S_o^q + \pi, & S_o^q < 0 \end{cases} \quad (5)$$

wherein $S_o^q$ represents the single-channel multidirectional self-similarity feature;

For multi-channel self-similarity features, an angle-weighted strategy is applied to each channel to construct the multi-channel multidirectional self-similarity feature $\{S_o^q\}_C^1$; when building the multi-channel self-similarity graph, a circular feature neighborhood N with a radius of R pixels is used, with a total of C=N/2 channels; consequently, the resulting multi-channel multidirectional self-similarity feature $\{S_o^q\}_C^1$ has a dimension of C; to enhance the efficiency of template feature matching calculations, a sparsification strategy is applied to the feature channels, achieved through the following equation (6) to obtain a sparsified w-dimensional template feature map $\{S_o^q\}_w^1$:

$$w = \lceil C/m \rceil \quad (6)$$

Wherein w represents the dimensionality of the sparsified multidirectional self-similarity feature, C represents the dimensionality of the original multidirectional self-similarity feature, m is the sampling interval, and the symbol $\lceil \ \rceil$ denotes rounding up.

7. The method for multi-modal remote sensing image hybrid matching with multi-dimensional oriented self-similarity features according to claim 1, wherein in S7, the Gaussian convolution kernel is a two-dimensional Gaussian kernel in the horizontal and vertical directions, and a one-dimensional Gaussian kernel in the Z direction, denoted as $d_z = [1, 3, 1]^T$, as shown in Equation (7):

$$\begin{cases} S_o^\sigma(x, y) = g_{xy}^\sigma \otimes S_o^q \\ M^\sigma(x, y) = d_z \otimes S_o^\sigma(x, y) \end{cases} \quad (7)$$

Wherein $S_o^\sigma(x, y)$ represents the features after two-dimensional Gaussian filtering, $g_{xy}^\sigma$ represents the Gaussian kernel on the plane, $S_o^q$ represents the single-channel multidirectional self-similarity feature, $M^\sigma(x, y)$ represents the template feature after three-dimensional Gaussian filtering, $d_z$ is the Gaussian kernel in the z direction, $\otimes$ represents convolution operation, and $\sigma$ is the standard deviation of the Gaussian convolution kernel; and Finally, the multidirectional self-similarity features are normalized, and then the features of $M_i^\sigma(x, y)$ are combined to form a multidirectional self-similarity feature map, as shown in Equation (8):

$$MOSS(x, y) = \{M_i^\sigma(x, y)\}, i = [1, 2, 3 \ldots, w] \quad (8)$$

Wherein w represents the dimensionality of the sparsified multidirectional self-similarity feature.

8. The method for multi-modal remote sensing image hybrid matching with multi-dimensional oriented self-similarity features according to claim 1, wherein in S8, the block feature detector adopts the FAST detection model and employs a strategy of uniform grid partitioning, the image is initially divided into small blocks of equal area, feature points are extracted from each small block individually, and a fast sampling consistency algorithm is used to eliminate outliers.

9. The method for multi-modal remote sensing image hybrid matching with multi-dimensional oriented self-similarity features according to claim 1, wherein the method further comprises S9, including evaluating the matching effectiveness of the multi-modal remote sensing images using the root mean square error of corresponding points and the number of matched points.

10. A system for multi-modal remote sensing image hybrid matching with multidirectional self-similarity features, comprising the following modules:

Initialization Module configured to initialize the calculation parameters for the hybrid matching process;

Feature Point Extraction Module configured to utilize the offset mean filtering method to rapidly extract self-similarity features from the reference image generate a multi-channel self-similarity feature map, extract features from the feature response map, and perform non-maximum suppression to obtain feature points;

Initial Correspondence Acquisition Module configured to utilize the directional information of self-similarity features to describe feature points, calculate the main direction of feature points and computes descriptor feature vectors, and perform nearest-neighbor distance ratio matching, outputting the initial correspondence between image pairs;

Transformation Module configured to use the initial correspondence to perform geometric transformation on the image to be matched, producing the transformed result of the image to be matched;

Oriented Self-Similarity Feature Calculation Module configured to calculate directional self-similarity features for both the reference image and the newly generated image to be matched, producing a multi-channel self-similarity map;

Multidirectional Self-Similarity Template Feature Acquisition Module configured to design an angle-weighted strategy to calculate horizontal and vertical gradients channel-wise for the obtained multi-channel self-similarity map, filtering out repeated features through channel sparsity and obtains multidirectional self-similarity template features;

Feature Enhancement Module configured to enhance the features using a three-dimensional Gaussian convolution kernel after generating multidirectional self-similarity template features; and Matching Module configured to use a block feature detector to detect feature points in the reference image, employ feature points and a joint unit matrix to determine the relative positions of feature points in the newly generated image to be matched, wherein the enhanced template features are then transformed from the spatial domain to the frequency domain, three-dimensional phase correlation is used as a similarity measure to accelerate matching similar template features, and outliers are removed to complete the matching process for multi-modal remote sensing image.

* * * * *